(12) United States Patent
Quon

(10) Patent No.: US 12,517,018 B2
(45) Date of Patent: Jan. 6, 2026

(54) METHOD AND COMPOSITION FOR STAINING AND SAMPLE PROCESSING

(71) Applicant: Beckman Coulter, Inc., Brea, CA (US)

(72) Inventor: Carol Quon, Genoa, NV (US)

(73) Assignee: Beckman Coulter, Inc., Brea, CA (US)

( * ) Notice: Subject to any disclaimer, the term of this patent is extended or adjusted under 35 U.S.C. 154(b) by 921 days.

(21) Appl. No.: 17/066,195

(22) Filed: Oct. 8, 2020

(65) Prior Publication Data

US 2021/0108994 A1 Apr. 15, 2021

Related U.S. Application Data

(60) Provisional application No. 62/914,117, filed on Oct. 11, 2019.

(51) Int. Cl.
*G01N 1/30* (2006.01)

(52) U.S. Cl.
CPC ......... *G01N 1/30* (2013.01); *G01N 2001/302* (2013.01); *G01N 2001/305* (2013.01)

(58) Field of Classification Search
CPC .............. G01N 1/30; G01N 2001/302; G01N 2001/305
See application file for complete search history.

(56) References Cited

U.S. PATENT DOCUMENTS

| 4,983,375 | A * | 1/1991 | Mauthner | G01N 33/5094 |
| | | | | 435/40.51 |
| 9,279,750 | B2 | 3/2016 | Cremins et al. | |
| 9,322,753 | B2 | 4/2016 | Cremins et al. | |
| 2011/0229879 | A1 | 9/2011 | Churukian | |
| 2013/0244252 | A1 | 9/2013 | Weidner et al. | |

FOREIGN PATENT DOCUMENTS

| JP | 2003169694 | 6/2003 | |
| JP | 2017099328 | 6/2017 | |
| WO | 2014146063 | 9/2014 | |
| WO | WO-2014145984 A1 * | 9/2014 | .............. G01N 1/30 |
| WO | 2021072080 | 4/2021 | |

OTHER PUBLICATIONS

Sodium Acetate, https://en.wikipedia.org/wiki/Sodium_acetate (Year: 2023).*
"Phosphate-buffered saline", Wikipedia, https://en.wikipedia.org/wiki/Phosphate-buffered_saline (Year: 2024).*
https://en.wikipedia.org/wiki/Activity_coefficient (Year: 2025).*
https://en.wikipedia.org/wiki/Thermodynamic_activity (Year: 2025).*
https://www.westlab.com/blog/what-is-a-buffer-and-how-does-it-work (Year: 2025).*
"International Application Serial No. PCT US2020 054791, International Preliminary Report on Patentability mailed Apr. 21, 2022", 9 pages.
"International Application Serial No. PCT/US2020/054791, International Search Report mailed Jan. 26, 2021", 5 pgs.
"International Application Serial No. PCT/US2020/054791, Written Opinion mailed Jan. 26, 2021", 7 pgs.
"European Application Serial No. 20799914.5, Response filed Nov. 23, 2022 to Communication pursuant to Rules 161(2) and 162 EPC", 12 pgs.

* cited by examiner

*Primary Examiner* — Ruth A Davis
(74) *Attorney, Agent, or Firm* — Schwegman Lundberg & Woessner, P.A.

(57) ABSTRACT

The present disclosure relates to a staining methodology employing a particle contrast agent composition. The compositions described herein are capable of rapidly staining cells in a single step. The particle contrast agent composition can be comprised of a combination of one or more particle contrast agents, one or more permeabilizing agents, and one or more fixing agents. The particle contrast agent composition can include Basic Fuchsin; at least one of Brilliant Cresyl Blue, Azure B, Crystal Violet and New Methylene Blue; one or more permeabilizing agents; and Gluteraldehyde.

22 Claims, 10 Drawing Sheets

*Immature Granulocytes*

*Neutrophils*

Lymphocytes

Monocytes

*Eosinophils*

*Basophils*

Neutrophils

*Lymphocytes*

*Monocytes*

*Eosinophils*

*Basophils*

Giant Platelets

Platelet Clumps

METHOD AND COMPOSITION FOR STAINING AND SAMPLE PROCESSING

CROSS-REFERENCE TO RELATED APPLICATIONS

This application claims the benefit of U.S. Provisional Appl. No. 62/914,117, filed Oct. 11, 2019, which is incorporated by reference as if fully set forth herein.

BACKGROUND

Blood cell analysis is one of the most commonly performed medical tests for providing an overview of a patients health status. A blood sample can be drawn from a patient's body and stored in a test tube containing an anticoagulant to prevent clotting. A whole blood sample normally comprises three major classes of blood cells including red blood cells (erythrocytes), white blood cells (leukocytes) and platelets (thrombocytes). Each class can be further divided into subclasses of members. For example, five major types or subclasses of white blood cells (WBCs) have different shapes and functions. White blood cells may include neutrophils, lymphocytes, monocytes, eosinophils, and basophils. There are also subclasses of the red blood cell types. The appearances of particles in a sample may differ according to pathological conditions, cell maturity and other causes. Red blood cell subclasses may include reticulocytes and nucleated red blood cells.

A blood cell count estimating the concentration of RBCS, WBCs or platelets can be done manually or using an automatic analyzer. When blood cell counts are done manually, a drop of blood is applied to a microscope slide as a thin smear. Traditionally, manual examination of a dried, stained smear of blood on a microscope slide has been used to determine the number or relative amounts of the five types of white blood cells. Histological dyes and stains have been used to stain cells or cellular structures. For example, Wrights stain is a histologic stain that has been used to stain blood smears for examination under a light microscope. Staining a sample involves the use of multiple solutions and steps in proper order to ensure the staining agent is correctly applied and the cell structure is appropriately preserved. A fixing agent can be applied to the sample in a first step to preserve the sample from degredation and maintain the cell structure. Afterwards, a permeabilizing agent can be applied to the sample in a second step to dissolve cell membranes in order to allow the staining agent to enter the cells. The staining agent can be applied to the sample in a third step to stain the appropriate structures. The sample may be further rinsed for observation, or additional steps may be taken to apply additional stains, counterstains, or other perform other actions.

It is important to perform the steps in the appropriate order for the appropriate amounts of time. If the sample is permeabilized before being fixed, the cell structures in the sample can be degraded prior to being fixed and any ability to discern the original cellular morphology is lost. Additionally, the staining cannot occur prior to the permeabilizing step, or the staining agent will not properly penetrate the cells and stain the structures within the cells. Additionally, if any of the steps, such as fixing, permeabilizing, and staining, are performed too rapidly, the cell's morphology may be lost and/or the cell and its internal structures may not be properly stained. Current staining techniques require multiple steps and significant time.

Automated analyzers are becoming more prevalent. Aspects of automated diagnosis systems with flowcells are disclosed in U.S. Pat. Nos. 6,825,926; 6,184,978; 6,424,415; and 6,590,646, which are hereby incorporated by reference as if set forth fully herein.

The various automated systems described above rely on rapid analysis of samples. The number of and duration of the steps of the staining process can be a limiting factor in the speed and efficacy of automated particle analysis systems. Automated particle analysis systems can be more efficient if the staining process is shortened, and further more efficient if the staining process is performed in a single step. Additionally, the automated particle analysis systems can be more efficient if the total size of the sample is kept to a minimum.

It is sometimes difficult to obtain even staining for many cell types, including immature granulocytes. Further, it can be difficult to differentiate, e.g., monocytes and lymphocytes using the color features, There is therefore a need for stains or combinations of stains that solve the aforementioned issues.

SUMMARY

The present disclosure relates to an improved particle contrast agent composition for rapidly generating visual distinctions in a sample, such as a blood fluid sample and/or a body fluid sample. The particle contrast agent composition can be especially useful in automated flow cytometry systems.

In a first aspect, the disclosure relates to a particle contrast agent composition for staining particles, the particle contrast agent composition comprising: Basic Fuchsin; at least one of Brilliant Cresyl Blue, Azure B, Crystal Violet and New Methylene Blue; one or more permeabilizing agents; and one or more fixing agents. Such compositions are suitable for imaging a blood fluid sample or a body fluid sample in an automated particle analysis system.

In a second aspect, the disclosure relates to a method of treating particles of a blood fluid sample or a body fluid sample comprising: combining the blood fluid sample or a body fluid sample with a particle contrast agent composition comprising Basic Fuchsin; at least one of Brilliant Cresyl Blue, Azure B, Crystal Violet and New Methylene Blue; one or more permeabilizing agents; and one or more fixing agents to obtain a sample mixture; and incubating the sample mixture at a temperature between about 37° C. and about 60° C. for fewer than 90 seconds. The method can be performed in an automated particle analysis system.

In a third aspect, the disclosure relates to kits comprising a particle contrast agent composition comprising Basic Fuchsin; at least one of Brilliant Cresyl Blue, Azure B, Crystal Violet and New Methylene Blue; one or more permeabilizing agents; and one or more fixing agents all in a suitable container.

In a fourth aspect, the disclosure relates to kits comprising, in separate containers: Basic Fuchsin in a first container; at least one of Brilliant Cresyl Blue, Azure B, Crystal Violet and New Methylene Blue in a second container; one or more permeabilizing agents in a third container; and one or more fixing agents in a fourth container.

In a fifth aspect, the disclosure relates to kits comprising: in a first container, Basic Fuchsin, at least one of Brilliant Cresyl Blue, Azure B, Crystal Violet and New Methylene, and one or more permeabilizing agents; and in a second container, one or more fixing agents.

In a sixth aspect, the disclosure relates to kits comprising: in a first container, Basic Fuchsin and at least one of Brilliant Cresyl Blue, Azure B, Crystal Violet and New Methylene; one or more permeabilizing agents in a second container; and in a third container, one or more fixing agents.

In a seventh aspect, the disclosure relates to kits comprising: in a first container, Basic Fuchsin and at least one of Brilliant Cresyl Blue, Azure B, Crystal Violet and New Methylene; in a second container one or more permeabilizing agents and one or more fixing agents.

DESCRIPTION OF THE DRAWINGS

The drawings illustrate generally, by way of example, but not by way of limitation, various embodiments discussed herein.

DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

The present disclosure relates to an improved particle contrast agent composition for rapidly generating visual distinctions in a sample, such as a blood fluid sample and/or a body fluid sample. Examples of body fluid samples include serous fluid (e.g., pleural, pericardial, peritoneal, and lavage fluids), amniotic fluid, cerebrospinal fluid, seminal fluid, synovial fluid, bone marrow aspirate fluid, effusions and exudates. The particle contrast agent composition can be especially useful in automated flow cytometry systems, such as the one described in U.S. Pat. No. 9,279,750, which is incorporated by reference as if fully set forth herein. The particle contrast agent composition is comprised of a combination of a particle contrast agent, a permeabilizing agent, and a fixing agent. In one example, the particle contrast agent composition is a composition comprising: Basic Fuchsin; at least one of Brilliant Cresyl Blue, Azure B, Crystal Violet and New Methylene Blue; one or more permeabilizing agents; and one or more fixing agents.

The particle contrast agent compositions described herein, including for example, stain/dye compositions, and/or combinations thereof, can be used to perform automated, image-based sample analysis, such as blood analysis. Cells including at least one of platelets, reticulocytes, immature granulocytes, eosinophils, monocytes, and lymphocytes are able to absorb the particle contrast agent compositions described herein at a higher rate relative to other stains. Further, the particle contrast agent compositions described herein can be more evenly distributed throughout one or more of such cells.

The compositions and method disclosed herein can be used with manual staining and in many different types of particle analysis systems, including hematology imaging systems. For example, the compositions and methods described herein can be used with image-based sample analysis, such as flowcell analysis. An example of such a flowcell analysis can include traditional; known methods of flow cytometry.

Figure 1:
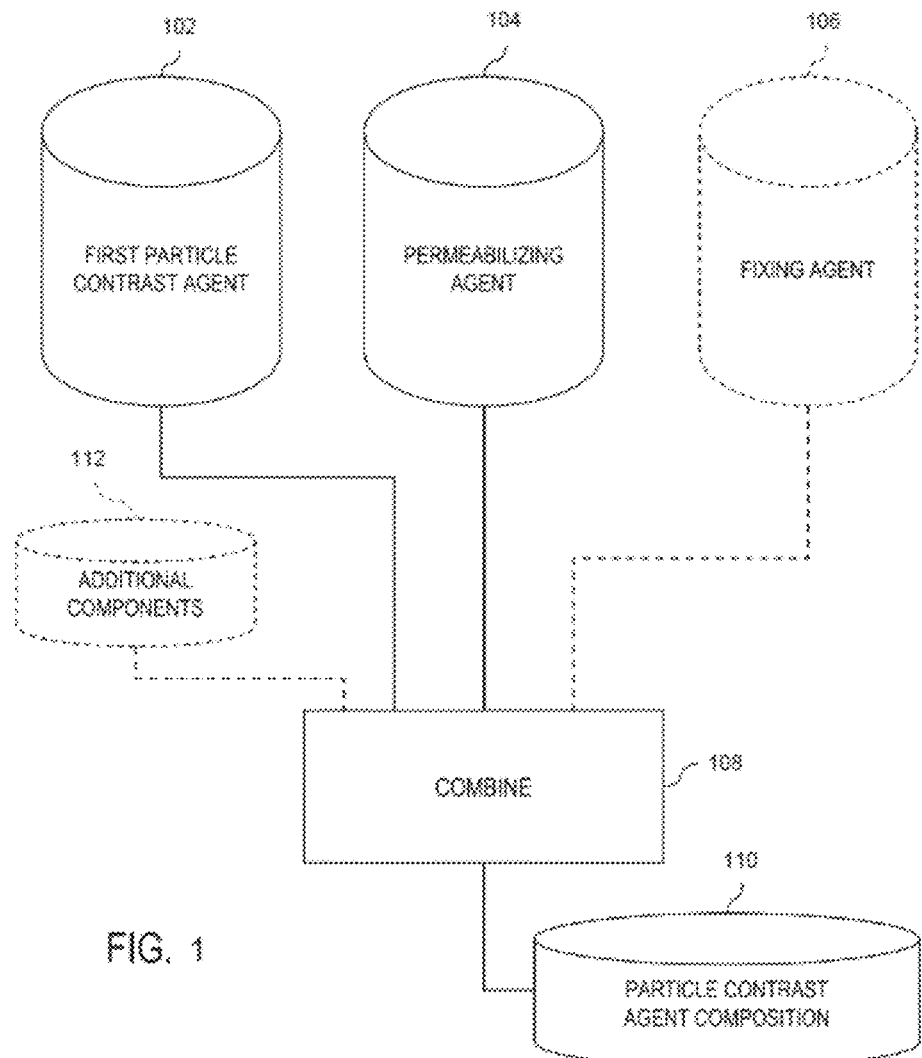
FIG. 1 is a schematic diagram of the preparation of a particle contrast agent composition according to the disclosure.

FIG. 1 is a schematic diagram of the preparation of a particle contrast agent composition according to one embodiment. At block 108, a particle contrast agent 102, a permeabilizing agent 104, and a fixing agent 106 are combined to create the particle contrast agent composition 110. In one embodiment, the particle contrast agent 102, permeabilizing agent 104, and fixing agent 106 are combined at the same time. In other embodiments, one of the particle contrast agent 102, permeabilizing agent 104, and fixing agent 106 is combined with another one of the particle contrast agent 102, permeabilizing agent 104, and fixing agent 106, which is then combined with the last of the particle contrast agent 102, permeabilizing agent 104, and fixing agent 106, in any order. The combination at block 108 can be performed in any order and in any suitable way.

Alternatively, one of the permeabilizing agent 104 and fixing agent 106 is not included in the particle contrast agent composition 110. In various instances, additional materials can be combined at block 108 as part of the particle contrast agent composition 110, as described in further detail below.

The particle contrast agent compositions 110 described herein can be provided as part of a kit. The particle contrast agent composition 110 can be provided already prepared or as one or more components that must be combined.

The particle contrast agent 102 can be any contrast agent capable of producing visible distinctions in particular, cells including at least one of immature granulocytes, eosinophils, monocytes, and lymphocytes. The particle contrast agent compositions 110 described herein comprise Basic Fuchsin in combination with at least one additional particle contrast agent 102 such as, Alcian Blue and Alcian Blue 86 (PAS neutral and acidic mucosubstances); Alizarin Red S; Allura Red AC (azodye red dye #40); Analine Blue (cilia intensified with oxalic acid); Auramine O; Azure B; Azure C; Bismarck Brown; Brilliant Blue FCF (Comassie blue); Brilliant cresyl blue; Brilliant green; Carmium (red nuclear dye composed of Carminic acid and Potassium alum); Congo red; Chlorozol black E (nuclei black, cyto gray, glycogen pink); Cresyl violet acetate; Darrow red; Eosin bluish; Erythrosin B (red dye #3); Ethyl eosin; Fast Green FCF (green dye #3); Fuchin basic—(nuclei and flagella); Fluorescein-(Mercurochrome); Giemsa-peripheral blood smears; Harris hematoxylin-regressive nuclear stain; Indigo Carmine (Blue dye #2); Janus Green B (mitochondria); Jenner Stain—(peripheral blood smears); Light Green SF yellowish; MacNeal—(tetrachrome blood stain); Malachite green; Methyl orange; Martius yellow; Mayer's Hematoxylin-progressive nuclear stain; Methyl violet 2B; Methenamine Silver-Peroidic acid; Methylene violet; May Grunwald-hematological stain; MTT—formazan stain; Mucicarmine—primary tumor stain; Neutral red; Nigrosin; Nile Blue A; Nuclear Fast red C.I. 60760; Napthal AS; Nitro-Blue Tetrazolium-fast formazan dye; Orange G; Orange II; Orcein; Papanicolaou Stain EAS—brilliant cytoplasmic staining; Pararosanilin; Pararosanaline;

Periodic Acid Schiff-(PAS, specific carbohydrate stain); Phyloxine B; Protargol S; Pyronin B; Pyronin Y; Resazurin; Romanowsky-Giemsa; Rose Bengal; Safranin O; Sudan Black B; Sudan III—(with alpha-napthol stains myeloid granules); Sudan IV—stains triglycerides; Tartrazine—(azo dye Yellow #5); Thionin—stains meta chromatin; Triphenyl Tetrazolium; TTC—Formazan red dye; and Toluidine Blue O.

An example of a particle contrast agent composition 110; as described in further detail herein, is a particle contrast agent composition 110 comprising a particle contrast agent 102 that includes Basic Fuchsin and at least one of Brilliant Cresyl Blue, Azure B, Crystal Violet and New Methylene Blue. In one example, the particle contrast agent 102 comprises Basic Fuchsin and at least one of Crystal Violet and New Methylene Blue. In another example, the particle contrast agent 102 comprises Basic Fuchsin and only Crystal Violet. In still another example, the particle contrast agent 102 comprises Basic Fuchsin and only New Methylene Blue. In yet another example, the particle contrast agent 102 comprises Basic Fuchsin, Crystal Violet, and New Methylene Blue. The particle contrast agent 102 is added in an amount effective to stain viable and/or substantially intact cells for image-based categorization and subcategorization. The particle contrast agent 102 can be any combination of two or more of the aforementioned particle contrast agents.

In one example, the particle contrast agent 102 includes Basic Fuchsin in an amount sufficient to achieve between about 1 µM to about 500 µM (e.g., from about 50 µM to about 200 µM, about 100 µM to about 200 µM, about 110 µM to about 190 µM or about 110 µM to about 180 µM) under staining conditions. As used herein, the term "under staining conditions" refers to when the component is mixed with the sample. The Basic Fuchsin can be purified to at least 90% pure. The Basic Fuchsin can be purified to at least 80%, 85%, 91%, 92%, 93%, 94%, 95%, 96%, 97%, or 98% pure. The Basic Fuchsin can be purified to at least 99% pure.

The particle contrast agent 102 can include Crystal Violet. The Crystal Violet can be present in amounts sufficient to achieve between about 1 µM to about 100 µM (e.g., from about 1 µM to about 50 µM, about 5 µM to about 25 µM, about 10 µM to about 50 µM or about 15 µM to about 30 µM) under staining conditions. As used herein, the term "under staining conditions" refers to when the component is mixed with the sample. The Crystal Violet can be purified to at least 90% pure. The Crystal Violet can be purified to at least 91%, 92%, 93%, 94%, 95%, 96%, 97%, or 98% pure. The Crystal Violet can be purified to at least 99% pure. The particle contrast agent 202 can be solely Crystal Violet, or can be Crystal Violet combined with one or more additional particle contrast agents.

The particle contrast agent 102 can include New Methylene Blue. The New Methylene Blue can be present in amounts sufficient to achieve between about 70 µM to about 2.4 mM (e.g., from about 100 µM to about 500 µM, about 100 µM to about 1.5 mM, about 500 µM to about 1.5 µM or about 750 µM to about 1.5 µM) under staining conditions. The New Methylene Blue can be present in amounts sufficient to achieve between about 500 µM to about 950 µM under staining conditions. The New Methylene Blue can be purified to at least 70% pure. The New Methylene Blue can be purified to at least 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% pure. The New Methylene Blue can be purified to at least 100% pure.

In one example, the particle contrast agent 102 includes Basic Fuchsin and both Crystal Violet and New Methylene Blue.

In another example, the particle contrast agent 102 is a combination of Crystal Violet, New Methylene Blue, and Basic Fuchsin, each having any combination of concentrations and purities as described herein. The particle contrast agent 102 can comprise specifically Crystal Violet present in amounts sufficient to achieve about 15 µM to about 30 µM under staining conditions, New Methylene Blue present in amounts sufficient to achieve about 750 µM to about 1.5 mM under staining conditions, and Basic Fuchsin present in amounts sufficient to achieve about 100 µM to about 200 µM under staining conditions.

The permeabilizing agent 104 can include a surfactant. The permeabilizing agent 104 can include, among other components, a saponin. Alternatively, or in addition to a saponin, the permeabilizing agent 104 can include at least one of a quarternary ammonium salt, a nonionic surfactant, and a zwitterionic surfactant. The permeabilizing agent can alter the permeability of a cell in order to increase accessibility of the particle contrast agent 102 to the intracellular contents. The permeabilizing agent can be selected and included in quantities sufficient to permit a one-step staining procedure.

Examples of a nonionic surfactant can include (1) polyoxyethylene alkyl or aryl ethers (polyethoxylates), including straight-chain aliphatic hydrophobes etherified to polyethylene glycol or polyoxyethylene ethanol, e.g., Brij™ 35; (2) branched-chain aliphatic/aromatic (e.g., octylphenol) hydrophobes etherified to polyethylene glycol, e.g., Triton VM-100; (3) straight-chain aliphatic/aromatic (e.g., n-nonylphenol) hydrophobes etherified to polyethylene glycol, e.g., Igepal™ C0897; and (4) straight-chain aliphatic (e.g., carboxylic acid) hydrophobes esterified to polyethylene glycol, e.g., Myrj™ 53, and others. Examples of nonionic polyoxyethylene alkyl or aryl ethers (polyethoxylates) surfactants can include polyoxyethylene(4) lauryl ether (Brij™ 30); polyoxyethylene(23) lauryl ether (Brij™ 35); polyoxyethylene(2) cetyl ether (Brij™ 52); polyoxyethylene(20) cetyl ether (Brij™ 58); polyoxyethylene(2) stearyl ether (Brij™ 72); polyoxyethylene(10)stearyl ether (Brij™ 76); polyoxyethylene(20) stearyl ether (Brij™ 78); polyoxyethylene(2) oleyl ether (Brij™ 92); polyoxyethylene(10) oleyl ether (Brij™ 96); polyoxyethylene(20) oleyl ether (Brij™ 98); polyoxyethylene(21) stearyl ether (Brij™ 721); polyoxyethylene(100) stearyl ether (Brij™ 700); and others. Further examples of nonionic surfactants can include Triton X™-100 (non-reduced or reduced), Triton™X-114 non-reduced or reduced), Triton X™-165, and Triton X™-305 (non-reduced and reduced), and others.

Examples of zwitterionic surfactants can include TDAPS (tetradecyldimethylammoniopropanesulfonate), CHAPSO (3-[(3-cholamidopropyl)dimethylammonio]-2-hydroxy-1-propanesulfonate), alkyl N,N-dimethyl N-oxides having from about 12 to about 16 carbon atoms, lauryl dimethylamine N-oxide (LO), DDAPS (N-dodecyl-N,N-dimethyl-3-ammonio-1-propanesulfonate), and others.

The permeabilizing agent 104 can include an agent sufficient to lyse red blood cells. The permeabilizing agent 104 can include an agent sufficient to lyse red blood cells other than reticulocytes or nucleated red blood cells. The permeabilizing agent 204 can include an agent sufficient to lyse red blood cells while white blood cells, reticulocytes; nucleated red blood cells, platelets, and other cells remain substantially intact. The permeabilizing agent 104 can render the membranes and/or nuclear membranes of white blood cells, reticulocytes, nucleated red blood cells; and/or platelets more permeable and/or porous to facilitate access by the particle contrast agent 102. For example; the permeabilizing agent 104 is selected to be able to quickly create the pores or openings necessary to allow the particle contrast agent 102 to enter cells in the sample.

Effective results can be achieved with particle contrast agent compositions 110 with the use of a permeabilizing agent 104 that includes IRIS Lyse and CDS Lytic available from Clinical Diagnostics Solutions, Inc., Plantation, FL.

Effective results can be achieved with particle contrast agent compositions 110 with the use of a permeabilizing agent 104 that includes a saponin present in amounts sufficient to result in concentrations of about 10 mg/L to about 1000 mg/L under staining conditions. The saponin can be present in amounts sufficient to result in concentrations of about 50 mg/L to about 750 mg/L. The saponin can be a quarternary ammonium-substituted saponin ether.

The fixing agent 106 can be selected to ensure, among other things, the white blood cells do not degrade during staining and imaging. The fixing agent 106 can ensure other cells and cell structures do not degrade, Examples of fixing agents can include glutaraldyde; formaldehyde; cross-linking agents; ammonia picrate in isotonic saline (e.g., for methylene blue staining); ethyl alcohol; methanol (e.g., at room temperature, $-20°$ C. or $-70°$ C.); Heidenhain's Susa—$HgCl_2$, NaCl Trichloroacetic acid, formalin; Bouin's—Picric acid, Formalin, acetic acid; Duboseq-Brazil—Bouins with 80% EtOH; Carnoy's—EtOH, Chloroform, acetic acid; Zenker's—HgC.sub.12, $K_2CrO_7$, $NaSO_4H_2O$; acetocarmine; Gatensby's—Chromic acid; Osmium tetroxide, NaCl; Bakers—Formalin, $CaCl_2$; Smith's—$K_2Cr_2O_7$, formalin, acetic acid; 1% methyl green, 1% acetic acid; Phenol, formalin, glycerol, Genetian violet; Schaudin—$HgCl_2$, EtOH, acetic acid; Champy's—Chromic acid, $K_2CrO_7$, $OsO_4$; Fleming's—Cromic acid; $OsO_4$; acetic acid; Formol-Silver—Formaldehyde; $AgNO_3$; Streck's Tissue Fixative—Bronopol, Diazolidinyl urea, $ZnSO_47H_2O$, sodium citrate; 1% imidazolidnyl urea in PBS; Glyoxal: Glyofix, Prefer, Safefix, Histochoice; Glydant—Hydantoin; Dimethylol urea; Sodium hydroxymethylglycinate; Karnovsky's; Mecuric chloride (B-5); Hollande's; and others. In addition, suitable fixing agents can include any of the following either alone or in combination.

The fixing agent 106 can be an oxidizing agent, a mercurial, a picrate, a hepes-glutamic acid buffer-mediated organic solvent protection effect (HOPE) fixative, or a water soluble preservative. Examples of oxidizing agents include Potassium dichromate, chromic acid, potassium permanganate; and others. Examples of mercurial include B-5, Zernker's fixative, and others. Examples of water-soluble preservatives include methyl paraben, propyl paraben, dimethylolurea, 2-pyridinethiol-1-oxide, sorbic acid, potassium sorbate, and others.

Effective results can be achieved in some embodiments of the particle contrast agent composition 110 with the use of a fixing agent 106 that includes at least one of Gluteraldehyde and Formaldehyde. For example, effective results can be achieved by using a fixing agent 106 that includes Gluteraldehyde at or below 0.1% by weight.

Optional additional components 112 can be optionally combined at block 108 into the particle contrast agent composition 110. Examples of additional components 112 can include buffer components (e.g., Sodium Acetate, Sodium Borate; Sodium Bicarbonate, Sodium Citrate; Sodium Carbonate, Sodium Tartrate), viscosity modifying agents, an antimicrobial agent, an osmotic adjusting agent; an ionic strength modifier, a surfactant, a chelating agent, and others. Effective results can be achieved when the particle contrast agent composition 110 includes a phosphate buffered saline. Buffer components can be used to buffer the particle contrast agent composition 110 to a pH of about 5 to about 7. In addition, the contrast agent composition 110 can have an osmolarity of at least about 230 mOsm, such as an osmolarity of from about 280 mOsm to about 325 mOsm, about 285 mOsm to about 305 mOsm or about 240 mOsm to about 270 mOsm.

Examples of viscosity modifying agents include natural hydrocolloids (and derivatives), such as carrageenan, locust bean gum, guar gum, and gelatin; sugars (and derivatives), such as dextrose, fructose; polydextrose; dextrans; polydextrans; saccharides; and polysaccharides; semi-synthetic hydrocolloids (and derivatives), such as Methylcellulose, Carboxymethylcellulose; Synthetic hydro colloids (and derivatives), such as Carbopol™; and Clays (and derivatives), such as Bentonite and Veegum™.

Figure 2:
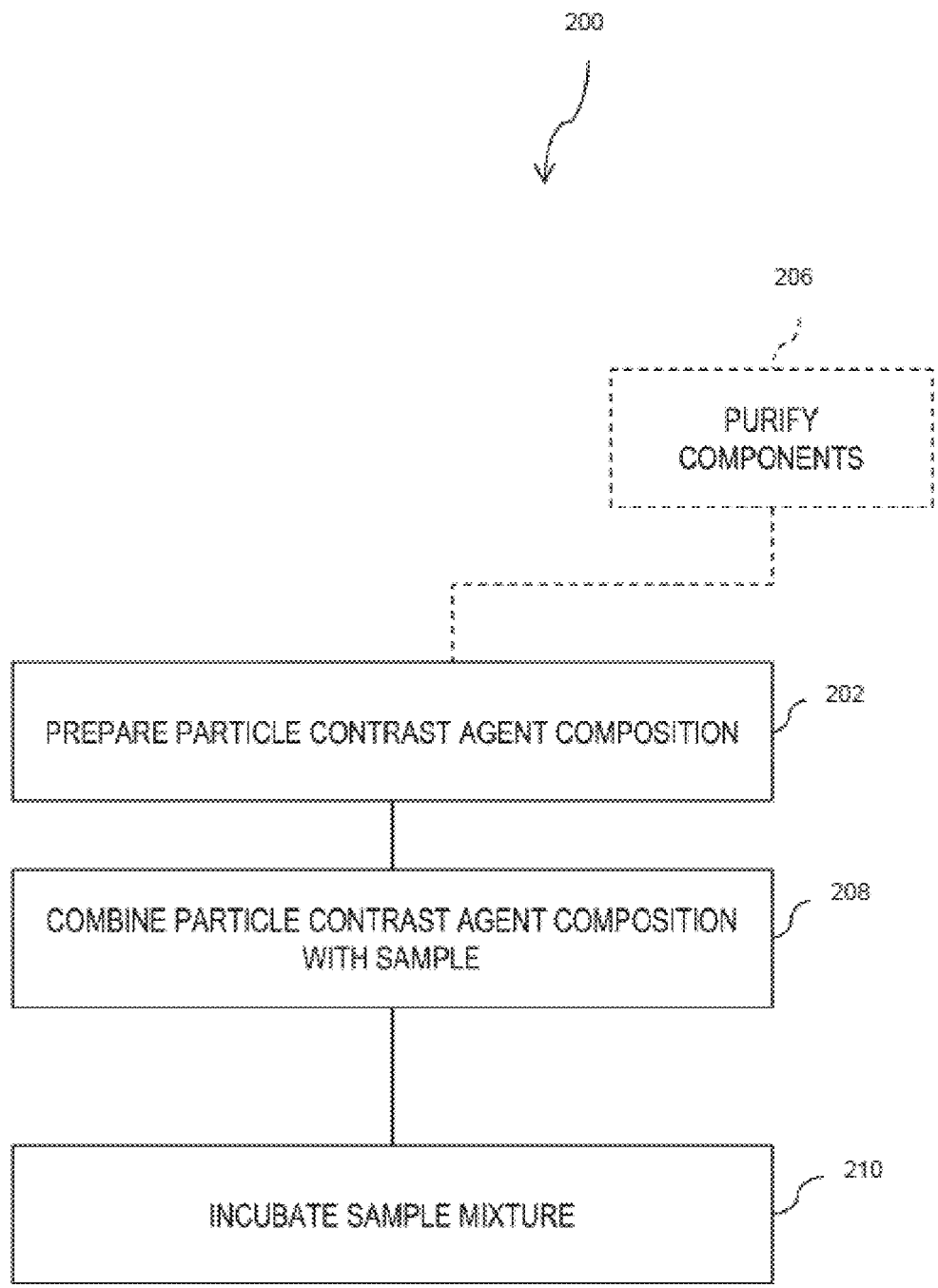
FIG. 2 is a flowchart of one-step staining process according to the disclosure.
Figure 3:
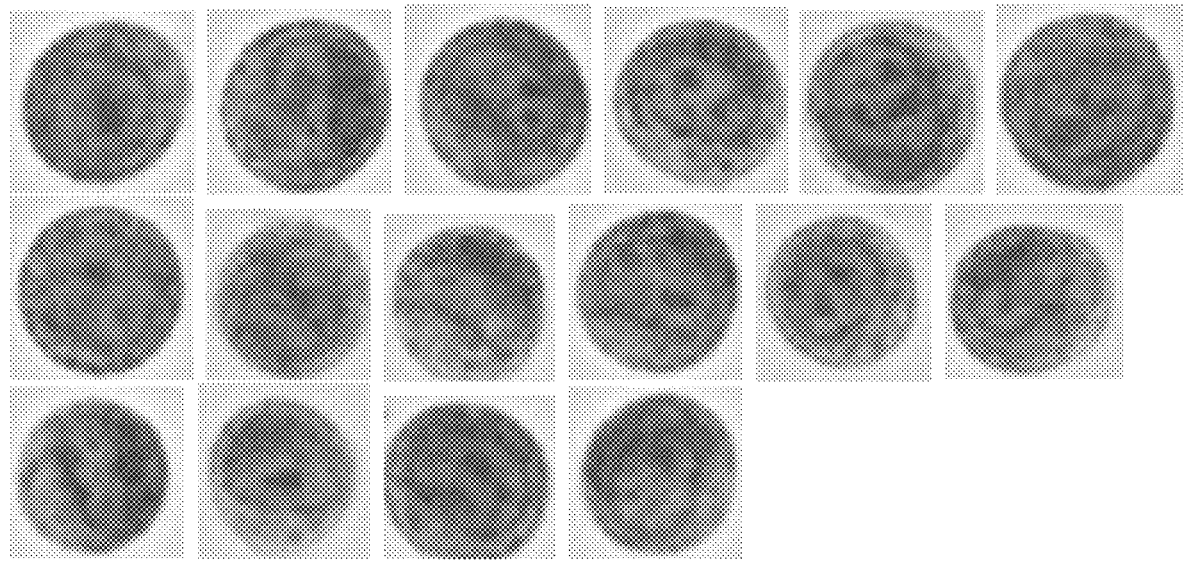
FIGS. 3-8 are photographs of immature granulocytes, neutrophils, lymphocytes, monocytes, eosinophils, and basophils, respectively, stained with the contrast agent composition according to the disclosure.
Figure 4:
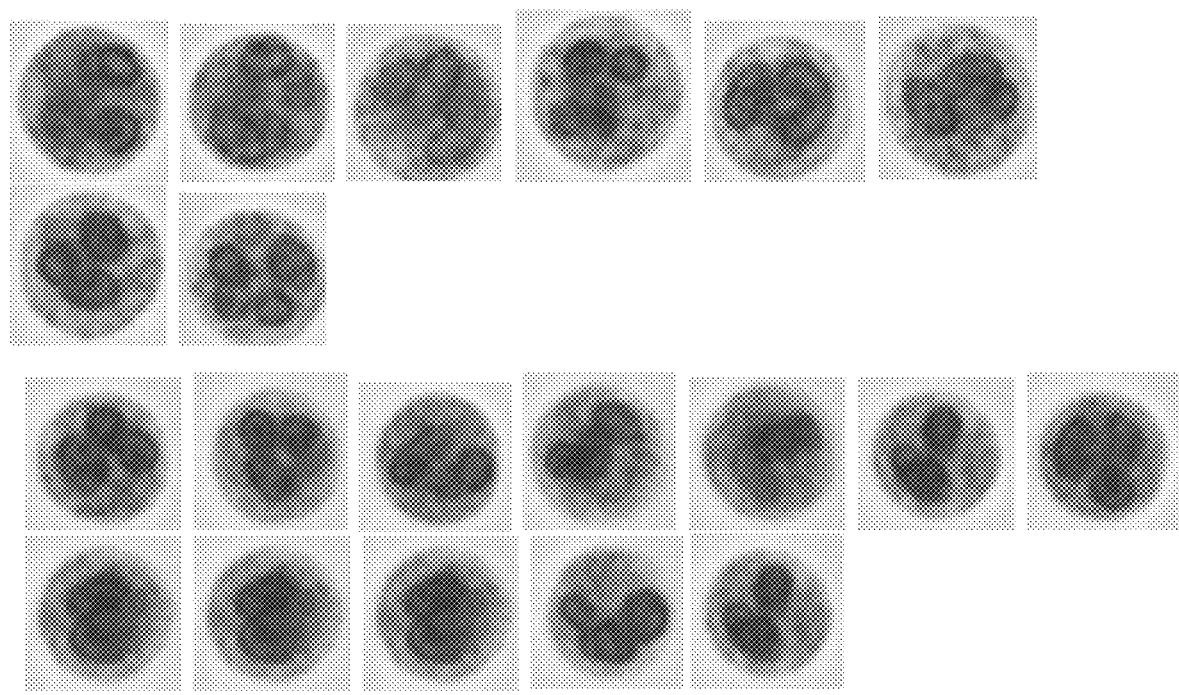
Figure 5:
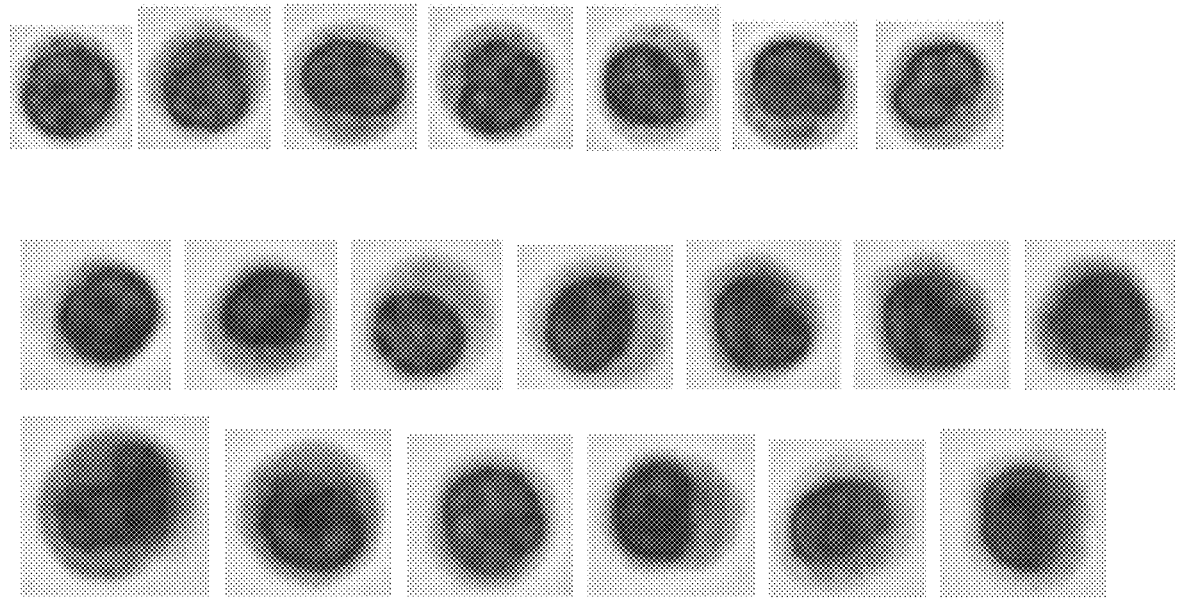
Figure 6:
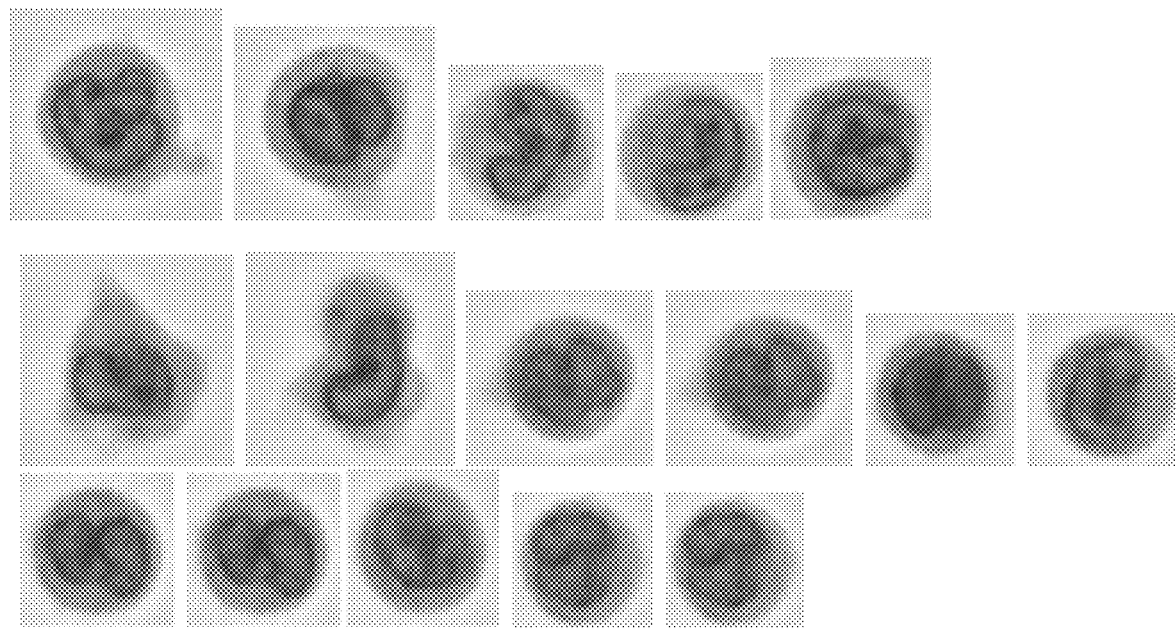
Figure 7:
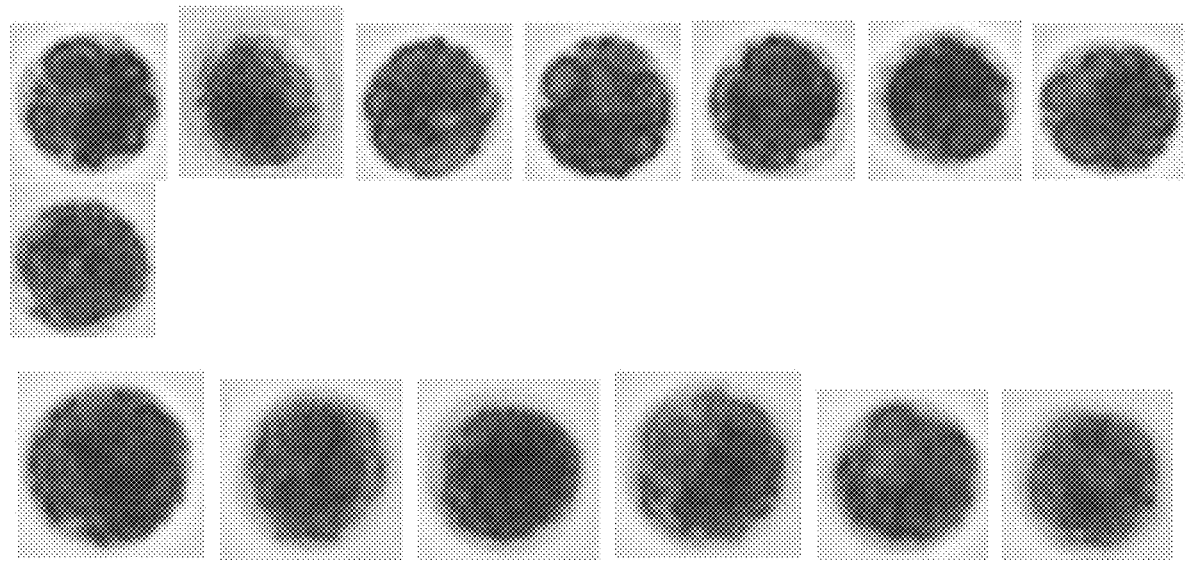
Figure 8:
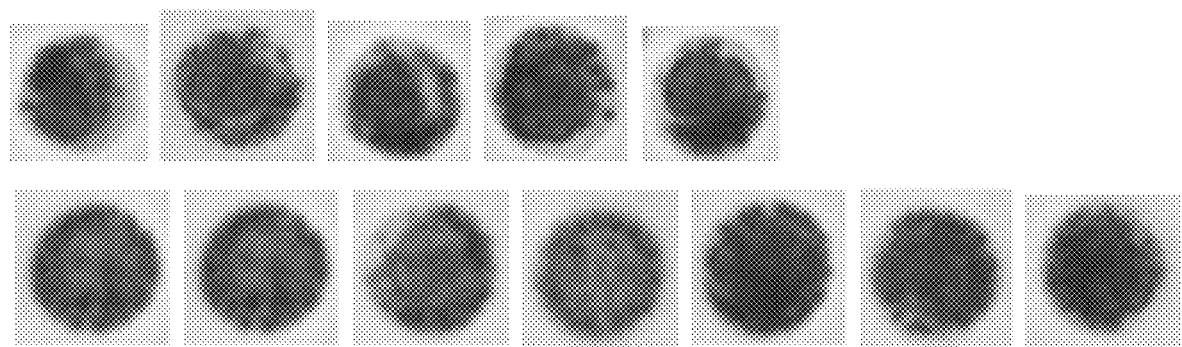
Figure 9:
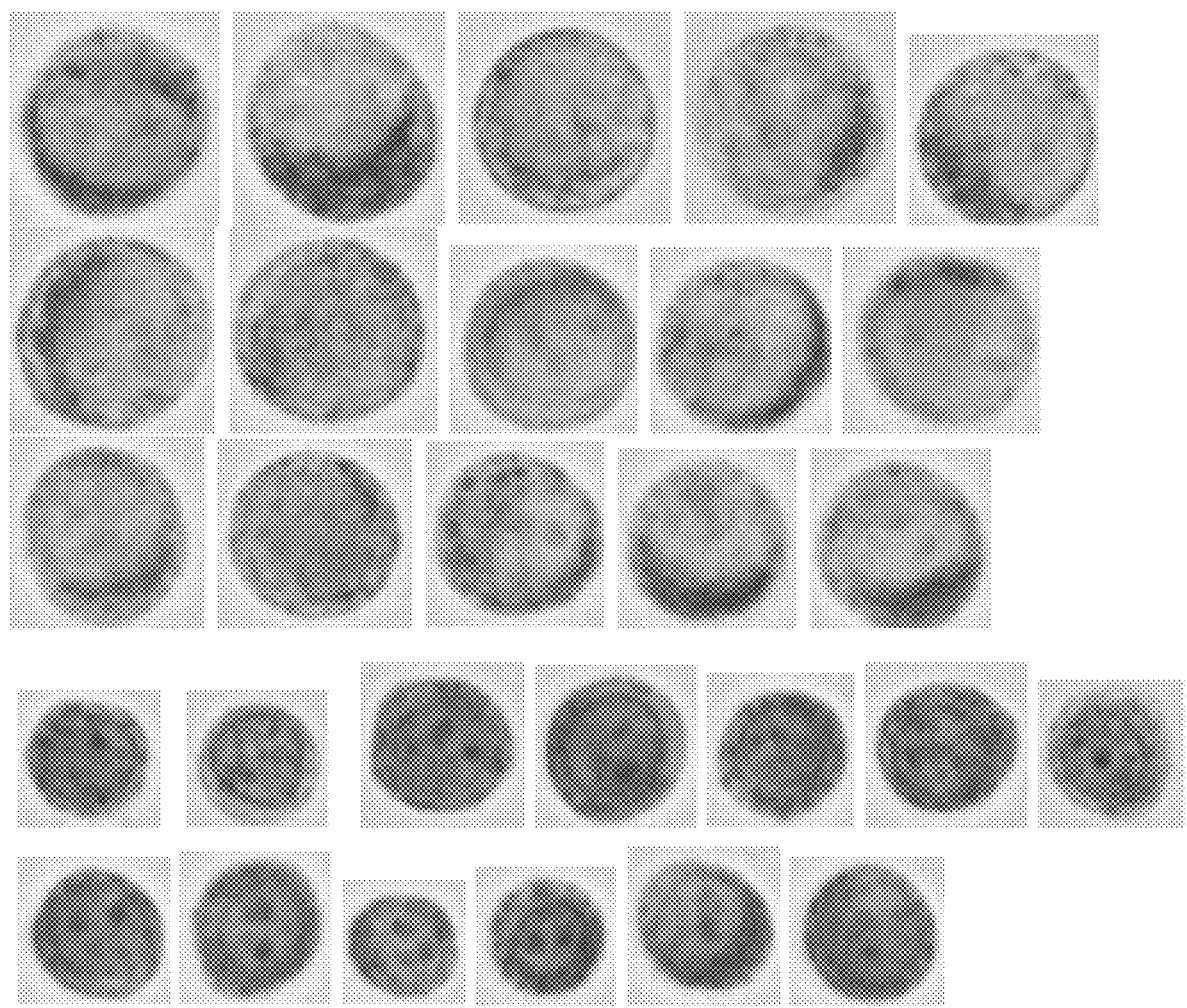
FIGS. 9-14 are photographs of immature granulocytes, neutrophils, lymphocytes, monocytes, eosinophils, and basophils respectively, stained with the contrast agent composition E43. The so-called E43 contrast agent composition is generally described in U.S. Pat. No. 9,279,750, which is incorporated by reference as if fully set forth herein.
Figure 9:
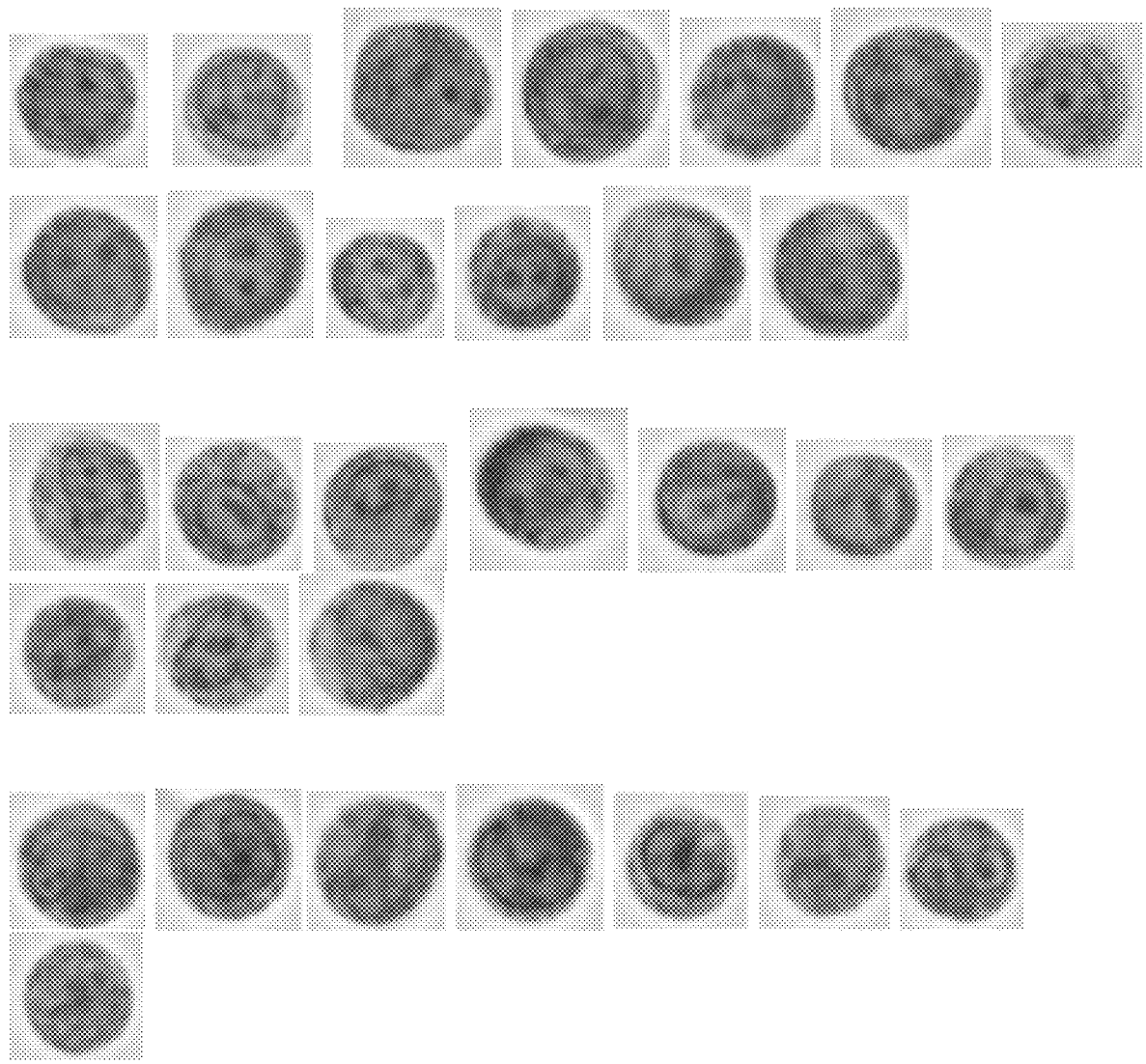
Figure 9:
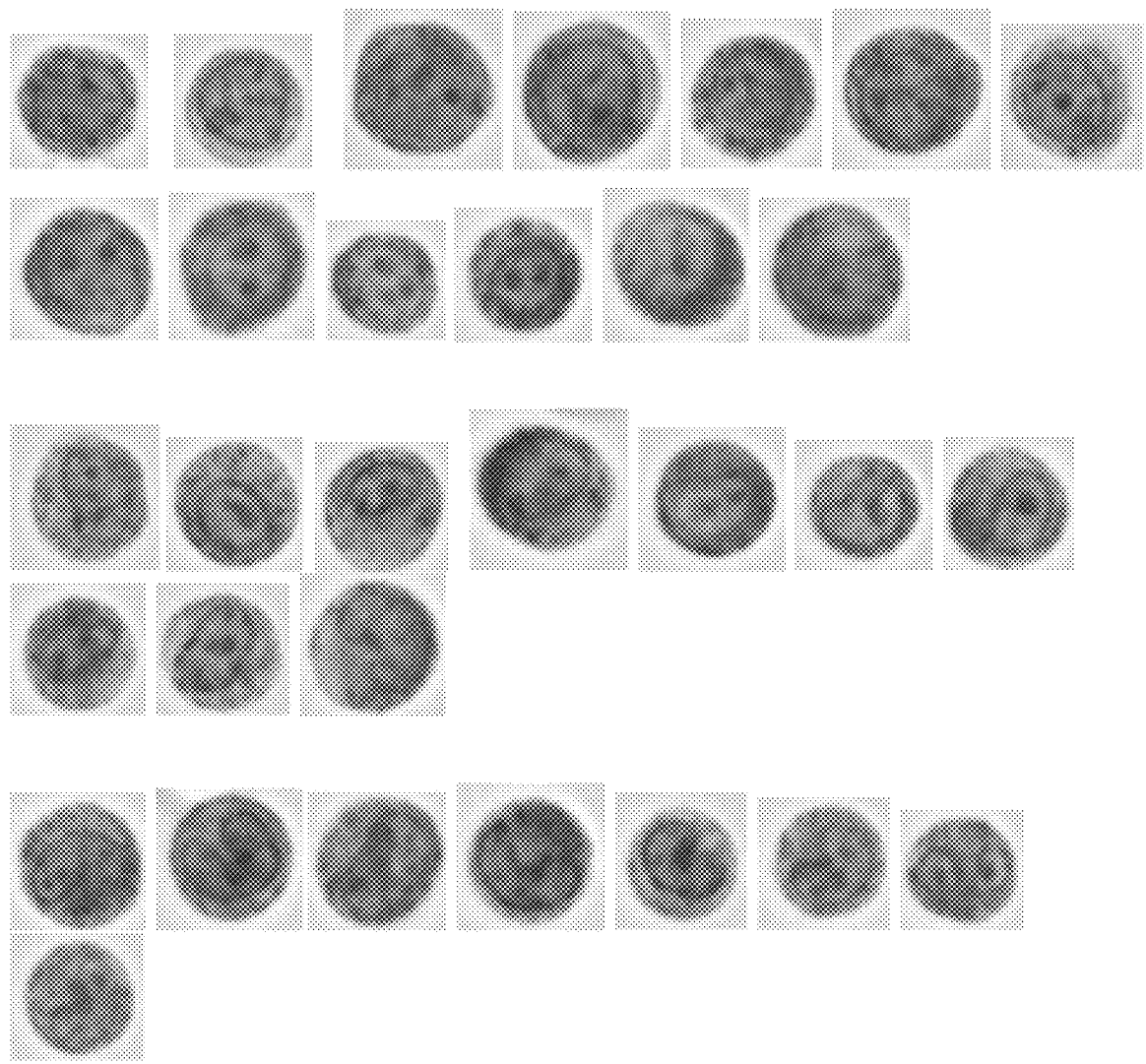
Figure 10:
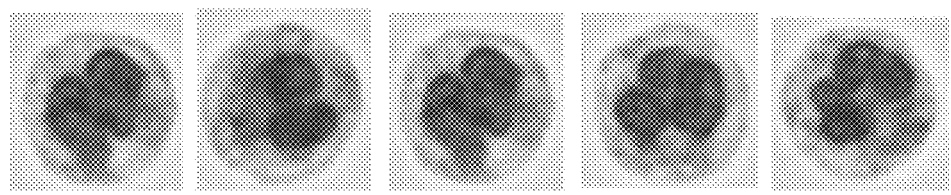
Figure 11:
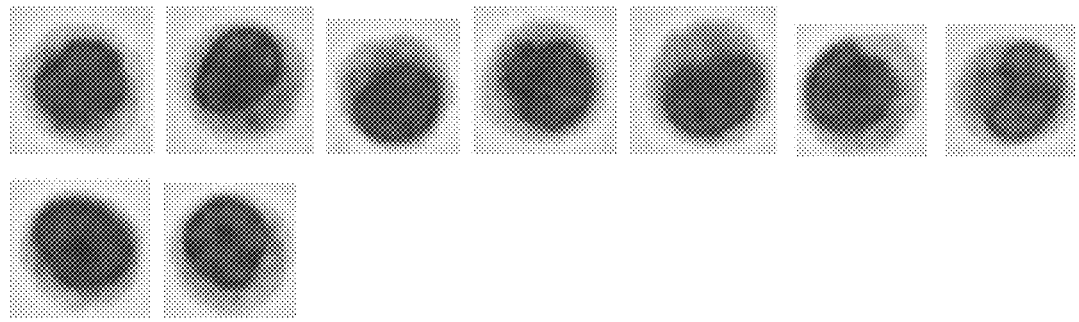
Figure 12:
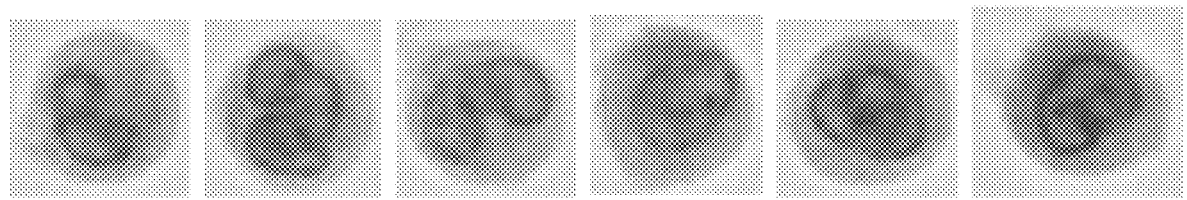
Figure 13:
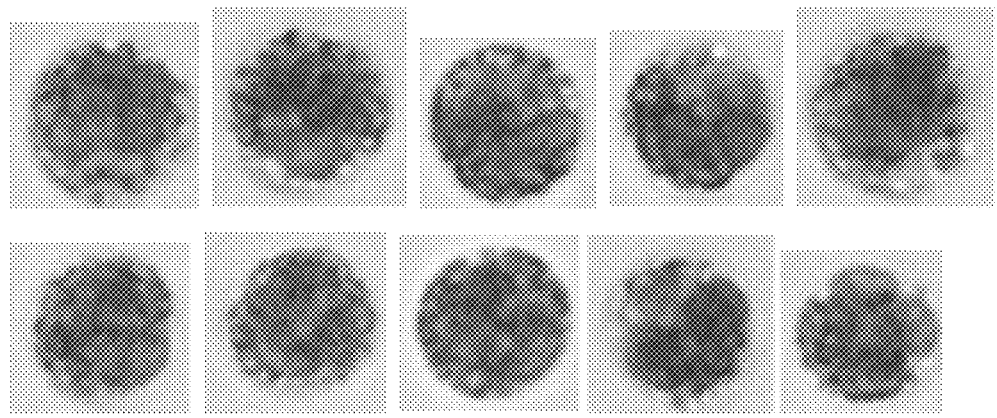
Figure 14:
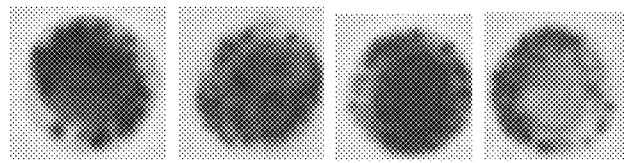
Figure 15:
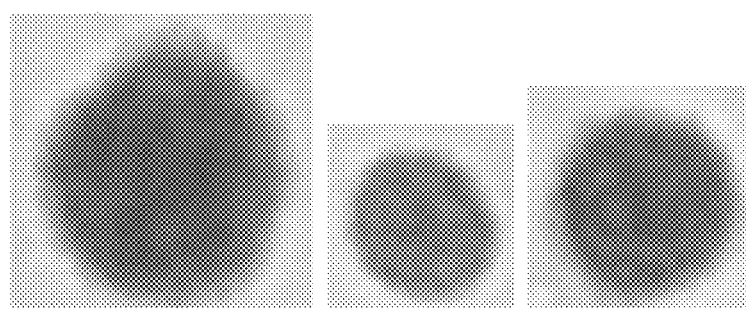
FIG. 15 is a photograph of giant platelets stained with the contrast agent composition according to the disclosure.
Figure 16:
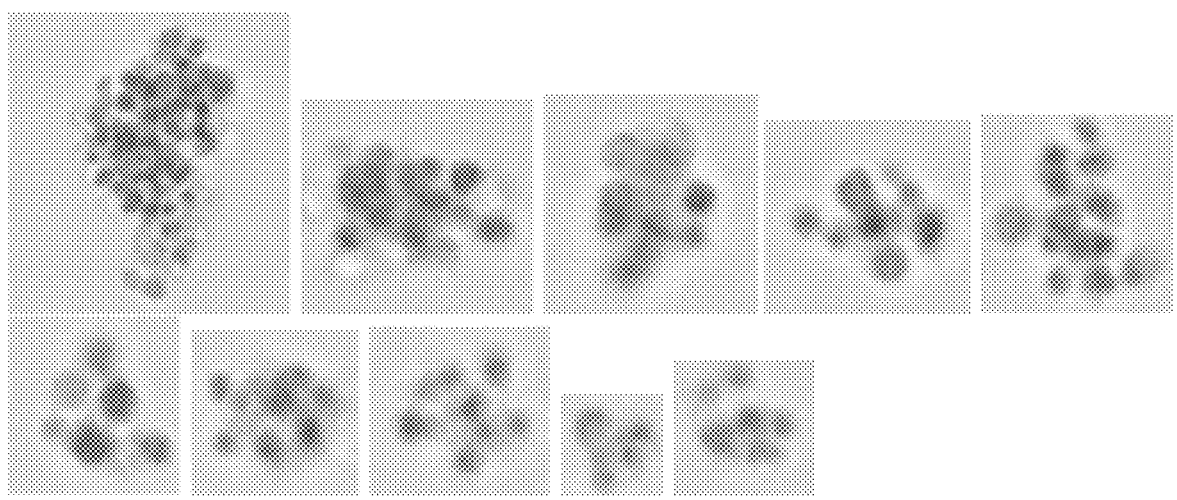
FIG. 16. Is a photograph of platelet clumps stained with the contrast agent composition according to the disclosure.

FIG. 2 is a flowchart of a one-step staining process 200. While the one-step staining process 200 can contain several sub-steps, the term "one-step" is used to identify that the sample need not be introduced to multiple, different solutions during the staining procedure. The particle contrast agent composition 110 is prepared at block 102, as described herein with reference to FIG. 1. Optionally, components, such as any particle contrast agents 102, can be purified at block 206. Purifying particle contrast agents 102 can reduce the level of precipitates formed upon contact with a sample, thereby reducing the background and improving the results of image-based blood sample analysis with a decreased need for further review of images or slides, or manually prepared microscopy.

At block 208, the particle contrast agent composition 110 is combined with the sample. The particle contrast agent composition 110 can be combined with the sample in any suitable way, including mixing together. Combining at block 208 can include diluting the sample with a certain amount of particle contrast agent composition 110. The sample can be diluted with particle contrast agent composition 110. The amount of dilution can be selected to provide an optimal number of cells per frame during an image-based analysis. The amount of dilution can be selected to provide an optimal number of white blood cells per frame during an image-based analysis. The amount of dilution can be otherwise selected to provide an optimal volume for any other non-image-based analysis.

Effective results can be achieved using a ratio of the particle contrast agent composition 110 to the sample at between about 2:1 to about 20:1. The ratio of the particle contrast agent composition 110 to the sample can be between about 3:1 to about 10:1. The ratio of the particle contrast agent composition 110 to the sample can be between about 3:1 to about 4:1. The ratio of the particle contrast agent composition 110 to the sample can be between about 3:1 or about 4:1. Effective results can be achieved using a ratio of the particle contrast agent composition 110 to the sample at very nearly 3:1 or very nearly 4:1.

In some instances, the sample can be combined with the particle contrast agent composition 110 at elevated temperatures, such as any of the temperatures described below with reference to incubating.

As used herein, the combined sample and particle contrast agent composition 110 is referred to as the sample mixture.

At block 210, the sample mixture is incubated for a certain amount of time at a certain temperature. Incubation can increase the permeability of the cells or their internal structures, allowing the particle contrast agent 102 to better infiltrate the cells or cellular structures. The time and temperature of incubation can be selected to enable the particle contrast agent composition 110 to properly permeate, fix, and stain the sample. The time and temperature of incubation can be selected to ensure lysing of red blood cells while keeping white blood cells, platelets, and nucleated red blood cells substantially intact. Thus, for example, the sample mixture can be incubated at temperatures between about 37° C. and about 60° C. for about 1 to 60 seconds. The sample mixture can be heated to temperatures between about 46° C. and about 49° C. The sample mixture can be incubated for between 40 and 50 seconds. The sample mixture can be incubated up to an hour. Effective results can be achieved by incubating the sample mixture at about 48° C. for about 45 seconds. Effective results can be achieved by incubating the sample mixture at about 47° C. for about 45 seconds.

The combining at block 208 and the incubating at block 210 complete in approximately the same amount of time or less time than the time it takes for a sample mixture to be processed in the imaging equipment and for the lines of the imaging equipment to be flushed and/or cleaned. In this way, a first sample mixture can be imaged while a second sample mixture is being combined and incubated. Once the first sample mixture has been imaged and the imaging equipment has been cleaned, the second sample mixture can immediately be imaged.

Alternatively, the combining at block 208 and the incubating at block 210 complete in less than twice the time it takes for a sample mixture to be processed in the imaging equipment and for the lines of the imaging equipment to be flushed and/or cleaned. In this way, while a first sample mixture is being imaged, a second sample mixture can be ready to be imaged, and a third sample mixture and fourth sample mixture can be in the process of being combined and incubated. Once the first sample mixture has been imaged and the imaging equipment has been cleaned, the second sample mixture can immediately be imaged. The third sample mixture can be finishing its combining and incubating and the fourth sample mixture can still be combining and incubating. Once the second sample mixture has been imaged and the imaging equipment has been cleaned, the third sample mixture can immediately be imaged, while the fourth sample mixture begins to finish combining and incubating and a fifth sample mixture begins combining and incubating. The process can continue indefinitely to continually image sample mixtures.

The particle contrast agent compositions 110 and staining procedures are effective to stain neutrophils, lymphocytes, monocytes, eosinophils, basophils, platelets, reticulocytes, nucleated red blood cells, blasts, promyelocytes, myelocytes, metamyelocytes, casts, bacteria, epithelials, and/or parasites. Additionally, or alternatively, the particle contrast agent compositionists 110 and staining procedures described herein are effective to stain mesothelial cells, macrophages, plasma cells, malignant cells, and crystals along with cells found in blood and bacteria. Certain effective particle contrast agent compositions 110 and staining procedures are effective to generate visual distinctions for particle categorization and subcategorization, for example, by providing for differential staining of primary and secondary granules in cells, such as to aid in sub-categorization of immature granulocytes and their age determination based on the differential staining or enhancement of primary and secondary granules.

The disclosure is also directed to methods of using the particle contrast agent compositions 110 described herein.

The particle contrast agent compositions 110 are suitable for imaging a blood fluid sample or a body fluid sample in an automated particle analysis system. The methods include, for example, methods of treating particles of a blood fluid sample or a body fluid sample comprising: combining the blood fluid sample or a body fluid sample with a particle contrast agent composition 110 to obtain a sample mixture; and incubating the sample mixture at a temperature between about 37° C. and about 60° C. for fewer than 90 seconds. The permeabilizing agent can comprise saponin present in amounts sufficient to result in concentrations between about 50 mg/L and about 750 mg/L under staining conditions. Alternatively, or in addition, the fixing agent can comprise gluteraldehyde present in amounts sufficient to result in concentrations at or below 0.1% under staining conditions. Alternatively, or in addition, the Basic Fuchsin can be present in an amount sufficient to result in concentrations between about 100 μM to about 200 μM under staining conditions. Alternatively, or in addition, the Crystal Violet is present in amounts sufficient to achieve between about 15 μM to about 30 μM under staining conditions. Alternatively, or in addition, the New Methylene Blue is present in amounts sufficient to achieve between about 750 μM to about 1.5 mM under staining conditions. Alternatively, or in addition, incubating the sample mixture includes heating the sample mixture to between about 40° C. and about 50° C. for about 30 seconds to about 60 seconds. Alternatively or in addition, combining the blood fluid sample or a body fluid sample with the particle contrast agent composition includes combining to a ratio of the blood fluid sample or a body fluid sample to the particle contrast agent composition of about 1:3 to about 1:6 (e.g., about 1:3 to about 1:5); and incubating the sample mixture includes heating the sample mixture to about 40° C. and about 50° C. for about 30 seconds to about 60 seconds. Alternatively, or in addition, the methods described herein can be performed in an automated particle analysis system.

The disclosure is also directed to kits. Kits may be conveniently assembled for use with the particle contrast agent compositions 110 described herein. The kit can contain at least one container for each of the components of the particle contrast agent compositions 110 described herein or it can contain a single container containing all of the components of the particle contrast agent compositions 110 described herein. Moreover, kits can include standard reagents and/or pre-measured components of the particle contrast agent compositions 110 described herein. Such kits can also include buffers. Finally, the kits can further include instructions regarding how the kit is to be used and/or examples of the staining patterns that can typically be expected for various cell types. In one example, a kit comprises the particle contrast agent composition 110 described herein in a suitable container. In another example, a kit can comprise, in separate containers: Basic Fuchsin in a first container; at least one of Brilliant Cresyl Blue, Azure B, Crystal Violet and New Methylene Blue in a second container; one or more permeabilizing agents in a third container; and one or more fixing agents in a fourth container. In another example, a kit can comprise: in a first container, Basic Fuchsin, at least one of Brilliant Cresyl Blue, Azure B, Crystal Violet and New Methylene, and one or more permeabilizing agents; and in a second container, one or more fixing agents. In still another example, a kit can comprise in a first container, Basic Fuchsin and at least one of Brilliant Cresyl Blue, Azure B, Crystal Violet and New Methylene; one or more permeabilizing agents in a second container; and in a third container, one or more fixing agents.

In still another example, a kit can comprise: in a first container, Basic Fuchsin and at least one of Brilliant Cresyl Blue, Azure B, Crystal Violet and New Methylene; in a second container one or more permeabilizing agents and one or more fixing agents.

Different arrangements of the components depicted in the drawings or described herein, as well as components and steps not shown or described are possible. Similarly, some features and sub-combinations are useful and may be employed without reference to other features and sub-combinations.

The instant disclosure is meant to be illustrative and not restrictive in purpose, and alternative embodiments will become apparent to readers of this patent. In certain cases, method steps or operations may be performed or executed in differing order, or operations may be added, deleted or modified. It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention. Accordingly, the disclosure is not limited to the embodiments described herein or depicted in the drawings, and various embodiments and modifications can be made without departing from the scope of the claims below.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

EXAMPLES

The present invention can be better understood by reference to the following examples which are offered by way of illustration. The present invention is not limited to the examples given herein.

Example 1

Numerous staining compositions and methods were tested and modified in order to result in the embodiments disclosed herein.

A body fluid sample was combined and incubated for 40 seconds at 47.5° C. with the contrast agent composition shown in Table 1.

TABLE 1

| | Final Concentration |
| --- | --- |
| NMB | 750 µM-1.5 mM |
| CV | 15 µM-30 µM |
| Basic Fuchsin | 100 µM-200 µM |

Concentrations of gluteraldehyde can be ≤about 0.1% by volume. Further, the buffer component can comprise, for example, about 40 mM to about 70 mM sodium acetate. In addition, a permeablizing agent is used to prepare a contrast agent, such as IRIS Lyse. Deionized water can be used to dissolve or dilute one or more components of the contrast agent. The permeabilizing agent can be used to dissolve at least one of the NMB and the CV to prepare a contrast agent.

In Table 1, NMB refers to New Methylene Blue; CV refers to Crystal Violet.

Then a quenching reagent was applied to the body fluid sample mixture. FIGS. 3-8 show how immature granulocytes, neutrophils, lymphocytes, monocytes, eosinophils, and basophils, respectively, in a body fluid sample are stained with the contrast agent composition shown in Table 2. FIGS. 9-14 are immature granulocytes, neutrophils, lymphocytes, monocytes, eosinophils, and basophils respectively, stained with the contrast agent composition E43. The so-called E43 contrast agent composition is generally described in U.S. Pat. No. 9,279,750, which is incorporated by reference as if fully set forth herein.

The staining results are remarkable in that the contrast agent composition shown in Table 2 provides darker and more uniform staining, with greater resolution. For example, immature granulocytes are stained better with more uniform staining. Further, eosinophil granules are darker stained with improved color identification. Finally, monocytes and lymphocytes are better stained and easy to distinguish.

What is claimed is:

1. A particle contrast agent composition for staining particles, the particle contrast agent composition comprising:
    Basic Fuchsin, wherein the Basic Fuchsin is present in an amount sufficient to result in a concentration of about 100 µM to about 200 µM under staining conditions;
    Crystal Violet;
    New Methylene Blue;
    one or more permeabilizing agents;
    one or more fixing agents; and a buffer component comprising sodium acetate that buffers the particle contrast agent composition to a pH of 5 to 7, wherein the sodium acetate is present in an amount sufficient to result in a concentration of 40 mM to 70 mM under staining conditions;
wherein the particle contrast agent composition has a pH of 5 to 7.

2. The composition of claim 1, wherein the Crystal Violet is present in amounts sufficient to achieve between about 15 µM to about 30 µM under staining conditions.

3. The composition of claim 1, wherein the New Methylene Blue is present in amounts sufficient to achieve between about 750 µM to about 1.5 mM under staining conditions.

4. The composition of claim 1, wherein the one or more fixing agents comprises glutaraldehyde.

5. The composition of claim 1, further comprising an antimicrobial.

6. The composition of claim 1 having an osmolarity of at least about 230 mOsm.

7. The composition of claim 1 having an osmolarity of from about 240 mOsm to about 270 mOsm.

8. The composition of claim 1, wherein the composition is suitable for imaging a blood fluid sample or a body fluid sample in an automated particle analysis system.

9. A kit comprising the particle contrast agent composition of claim 1 in a suitable container.

10. A method of treating particles of a blood fluid sample or a body fluid sample comprising:
combining the blood fluid sample or a body fluid sample with the particle contrast agent composition of claim 1 to obtain a sample mixture; and
incubating the sample mixture at a temperature between about 37° C. and about 60° C. for fewer than 90 seconds.

11. The method of claim 10, wherein the permeabilizing agent comprises saponin present in amounts sufficient to result in concentrations between about 50 mg/L and about 750 mg/L under staining conditions.

12. The method of claim 10, wherein the fixing agent comprises glutaraldehyde present in amounts sufficient to result in concentrations at or below 0.1% under staining conditions.

13. The method of claim 10, wherein the Basic Fuchsin is present in an amount sufficient to result in concentrations between about 100 µM to about 200 µM under staining conditions.

14. The method of claim 10, wherein the Crystal Violet is present in amounts sufficient to achieve between about 15 µM to about 30 µM under staining conditions.

15. The method of claim 10, wherein the New Methylene Blue is present in amounts sufficient to achieve between about 750 µM to about 1.5 mM under staining conditions.

16. The method of claim 10, wherein incubating the sample mixture includes heating the sample mixture to between about 40° C. and about 50° C. for about 30 seconds to about 60 seconds.

17. The method of claim 10, wherein combining the blood fluid sample or a body fluid sample with the particle contrast agent composition includes combining to a ratio of the blood fluid sample or a body fluid sample to the particle contrast agent composition of about 1:3 to about 1:6; and
incubating the sample mixture includes heating the sample mixture to about 40° C. and about 50° C. for about 30 seconds to about 60 seconds.

18. The method of claim 10, wherein the method is performed in an automated particle analysis system.

19. A kit comprising:
Basic Fuchsin in a first container;
Crystal Violet and New Methylene Blue in a second container;
one or more permeabilizing agents in a third container;
one or more fixing agents in a fourth container; and
a buffer component comprising sodium acetate, wherein contents of the first container, second container, third container, and fourth container are mixable to form a particle contrast agent composition comprising the buffer component and that is buffered to a pH of 5 to 7, wherein the Basic Fuchsin is present in the particle contrast agent composition in an amount sufficient to result in a concentration of about 100 µM to about 200 µM under staining conditions, and wherein the sodium acetate is present in the particle contrast agent composition in an amount sufficient to result in a concentration of 40 mM to 70 mM under staining conditions.

20. A kit comprising:
in a first container, Basic Fuchsin, Crystal Violet, and New Methylene, and one or more permeabilizing agents;
in a second container, one or more fixing agents;
a buffer component comprising sodium acetate, wherein contents of the first container and second container are mixable to form a particle contrast agent composition comprising the buffer component and that is buffered to a pH of 5 to 7, wherein the Basic Fuchsin is present in the particle contrast agent composition in an amount sufficient to result in a concentration of about 100 µM to about 200 µM under staining conditions, and wherein the sodium acetate is present in the particle contrast agent composition in an amount sufficient to result in a concentration of 40 mM to 70 mM under staining conditions.

21. A kit comprising:
in a first container, Basic Fuchsin, Crystal Violet, and New Methylene;
one or more permeabilizing agents in a second container;
in a third container, one or more fixing agents; and
a buffer component comprising sodium acetate, wherein contents of the first container, second container, and third container are mixable to form a particle contrast agent composition comprising the buffer component and that is buffered to a pH of 5 to 7, wherein the Basic Fuchsin is present in the particle contrast agent composition in an amount sufficient to result in a concentration of about 100 µM to about 200 µM under staining conditions, and wherein the sodium acetate is present in the particle contrast agent composition in an amount sufficient to result in a concentration of 40 mM to 70 mM under staining conditions.

22. A kit comprising:
in a first container, Basic Fuchsin, Crystal Violet, and New Methylene;
in a second container one or more permeabilizing agents and one or more fixing agents; and
a buffer component comprising sodium acetate, wherein contents of the first container and second container are mixable to form a particle contrast agent composition comprising the buffer component and that is buffered to a pH of 5 to 7, wherein the Basic Fuchsin is present in the particle contrast agent composition in an amount sufficient to result in a concentration of about 100 µM to about 200 µM under staining conditions, and wherein the sodium acetate is present in the particle contrast agent composition in an amount sufficient to result in a concentration of 40 mM to 70 mM under staining conditions.

* * * * *